(12) United States Patent
Kim

(10) Patent No.: US 6,266,526 B1
(45) Date of Patent: Jul. 24, 2001

(54) METHOD FOR COMMON USAGE OF MOBILE SWITCHING CENTER (MSC)

(75) Inventor: Young Joon Kim, Sungnam-Si (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,912

(22) Filed: Dec. 31, 1998

(30) Foreign Application Priority Data

Jun. 30, 1998 (KR) .................................................. 98-25928

(51) Int. Cl.⁷ ............................. H04M 1/66; H04M 1/68; H04M 3/16; H04Q 7/20; H04B 7/00
(52) U.S. Cl. ........................ 455/411; 455/426; 455/445; 455/456; 455/518; 379/265; 370/441
(58) Field of Search .................................. 455/411, 518, 455/456; 379/265; 370/441

(56) References Cited

U.S. PATENT DOCUMENTS

| | | | |
|---|---|---|---|
| 5,717,830 | * | 2/1998 | Sigler et al. ........................... 455/426 |
| 5,737,701 | * | 4/1998 | Rosenthal et al. .................... 455/411 |
| 5,797,100 | * | 8/1998 | Dettner ................................. 455/518 |
| 5,841,854 | * | 11/1998 | Schumacher et al. ................ 379/265 |
| 5,914,958 | * | 6/1999 | Chinitz et al. ........................ 370/441 |
| 5,924,041 | * | 7/1999 | Alperovich et al. .................. 455/456 |
| 6,011,975 | * | 1/2000 | Emery et al. ......................... 455/456 |
| 6,064,887 | * | 5/2000 | Kallioniemi .......................... 455/445 |

FOREIGN PATENT DOCUMENTS

727914  *  8/1996  (EP) .

* cited by examiner

Primary Examiner—William Cumming
(74) Attorney, Agent, or Firm—Long, Aldridge & Norman LLP

(57) ABSTRACT

A method for using a mobile switching center (MSC) having a large capacity, particularly a method for using a MSC such that many service providers can use the MSC in common, comprises confirming a caller group to which a corresponding caller belongs by checking a number when a call is initiated from the caller, receiving a called number, authenticating and authorizing the caller, and processing the caller and the call according to the caller group to which the caller belongs. When the authentication and authorization succeed, the process searches for a predefined greeting announcement for the particular caller group and, if one is found, connects the predefined greeting announcement to the caller. The process also determines according to the caller group whether a certain trunk should be used and, if so, connects the call to that trunk. If the authentication failed or authorization is denied caller, the method determines a authentication failed/authorization denied subscriber processing procedure corresponding to the caller group, and carrying out an operation according to the processing procedure. Also, the process may determine a charging format and desired statistical item(s) according to the corresponding caller group if a caller belongs to a caller group which desires to use a certain charging format and/or a statistical item(s).

13 Claims, 6 Drawing Sheets

METHOD FOR COMMON USAGE OF MOBILE SWITCHING CENTER (MSC)

BACKGROUND

1. Technical Field

The present invention relates to a method for using a mobile switching center (hereinafter, MSC) having a large capacity, and in particular to a method for multiple service providers to use a single MSC in common.

2. Background

Figure 1:
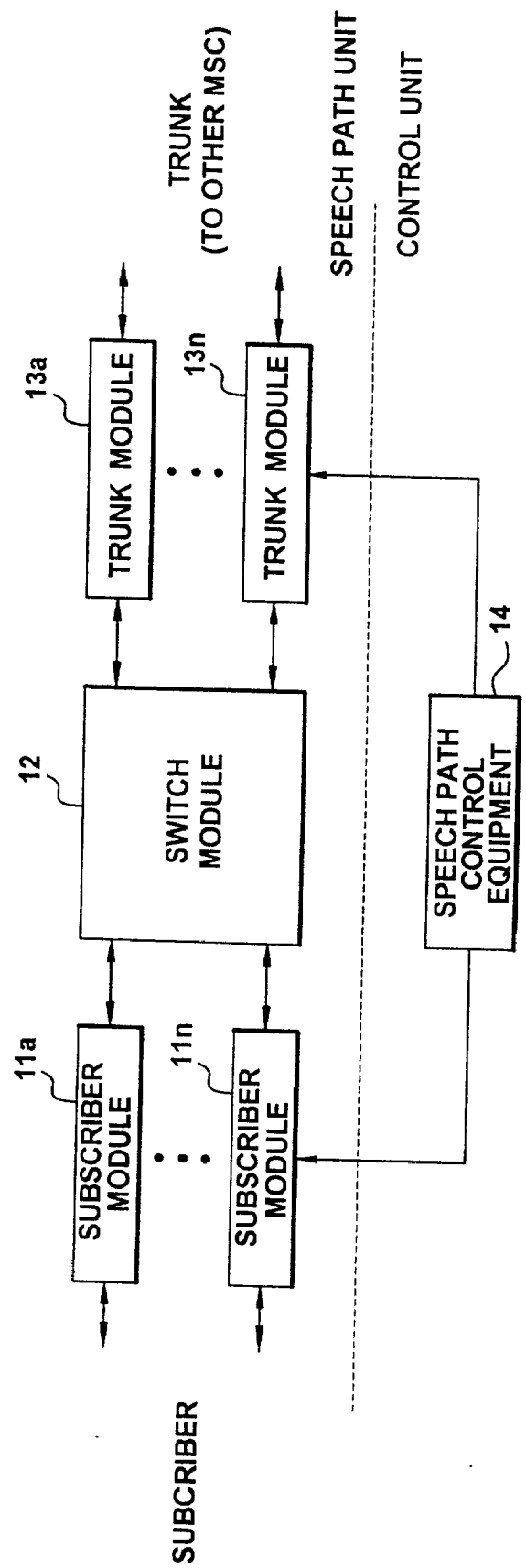

As depicted to FIG. 1, a conventional MSC is composed of: 1) a speech path unit including a plurality of subscriber modules 11a–11n for connecting subscriber lines, trunk modules 13a–13n for connecting a plurality of trunks, and a switch module 12 for switching the speech path; and 2) a control unit including a speech path control equipment (SPCE) 14 for controlling the speech path, performing operations such as connection and release.

Nearly all conventional MSCs operate according to international standards, so the basic functions inside mobile communication (hereinafter, MC) networks are implemented so that they may be commonly used by all service providers.

Figure 2:
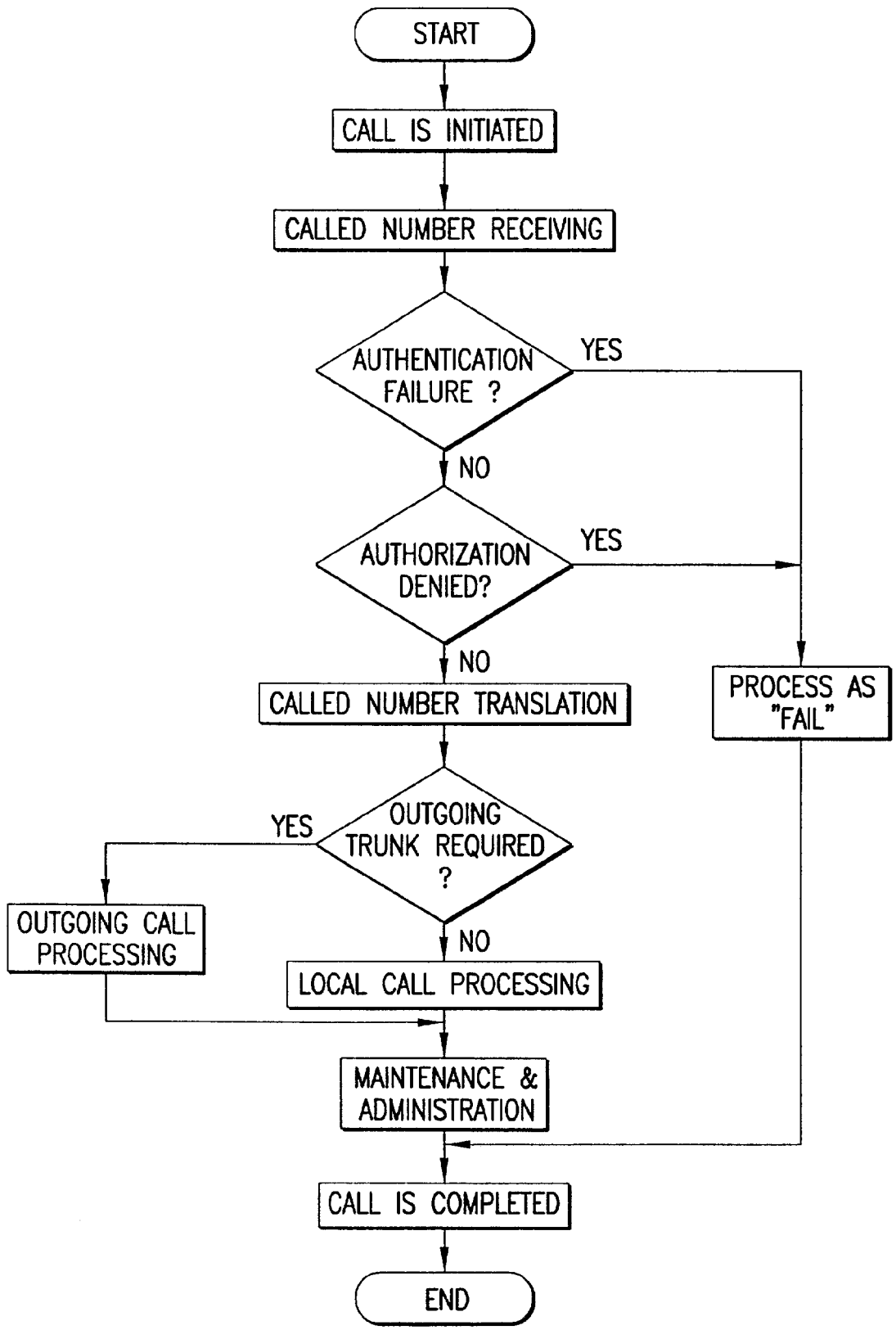

Each conventional MSC has a call-processing module, referring to FIG. 2. The call processing module must differ for each service provider according to the different set of provider policies and strategies for functions such as: processing method for authentication failure and denied authorization; usage of greeting announcements; usage of leased lines; usage of exclusive trunks for specific called numbers according to the specific service provider; usage of hot lines; presence of Customer Information Center (CIC); and the billing format. Accordingly, a service provider must possess exclusive usage of an MSC.

Therefore, regardless of the MSC equipment capacity of one service provider, other service providers have no choice but to install a separate MSC. In cases where subscribers belonging to a certain service provider are concentrated abnormally in a certain area and in a certain condition, communication service is limited by the service provider's MSC equipment capacity, though there may be ample resources available on other MSCs located in the same area belonging to other service providers.

Additionally, conventional MSCs perform call processing, trunk connections and announcement services indiscriminately in order according to the called number, regardless of the service provider to which the caller belongs. In other words, due to the fact that call-processing procedures are performed in an indiscriminate fashion in an MSC while the network operating policies of service providers vary from one another, it has not been possible for multiple service providers to use a common MSC.

SUMMARY

The objective of this invention is to provide a method for common usage of an MSC among multiple service providers. The method is achieved through taking into account both the call group (CG), i.e. the service provider of the caller, and the called number in the processing of services.

In order to achieve this, the present invention provides a method for the common usage of an MSC, which consist of:

identification of the CG of the caller;

reception of the called number, and authentication and authorization of the caller;

identification of the predefined handling method of the corresponding CG in cases of failures in authentication/authorization and execution of identified method;

determination of predefined announcements according to CG, connection of announcement to the caller, and connection to a certain trunk of the corresponding CG regardless of a called number which is dialed by the caller, by searching a predefined trunk;

call processing according to the outgoing trunk selected from determination of local termination, pre-assigned number according to CG or result of number translation on the called number;

determination of CIC connection requirement, searching the CIC number for the corresponding CG of caller, and connection/termination to CIC; and identification of a maintenance and administration function according to CG, and execution of billing and statistics procedures according to the format for the corresponding CG.

The invention also provides a method for the common usage of an MSC, regarding the treatment of callers according to CG for occurrences of failure in the authentication/authorization process listed above, which consists of:

identification of announcements according to CG and connection of the announcement to the caller;

identification of hotline numbers according to CG and connection of the hotline to the caller; and Connection of default announcement provided by MSC regardless of the caller's CG.

This invention also provides a method for the common usage of an MSC, regarding callers associated with a CG for which announcements are not required in the process for determination of predefined announcement listed above, which consists of:

identification of pre-assigned trunk and determination of whether or not routing through the pre-assigned trunk should be performed according to CG, and routing unconditionally through the identified trunk regardless of the dialed number.

This invention also provides a method for the common usage of an MSC, regarding selection of outgoing trunk from number translation on the called number in the call processing/outgoing trunk selection process listed above, which consists of:

call processing according to identification/selection of outgoing route according to CG and the called number, in cases where the service provider requires connection through a specific outgoing route among multiple outgoing routes designated to the CF, and identification and connection of CIC allocated according to CG, for callers associated with a CG requiring CIC connection, on occurrences of special conditions during call process.

BRIEF DESCRIPTION

Figure 3:
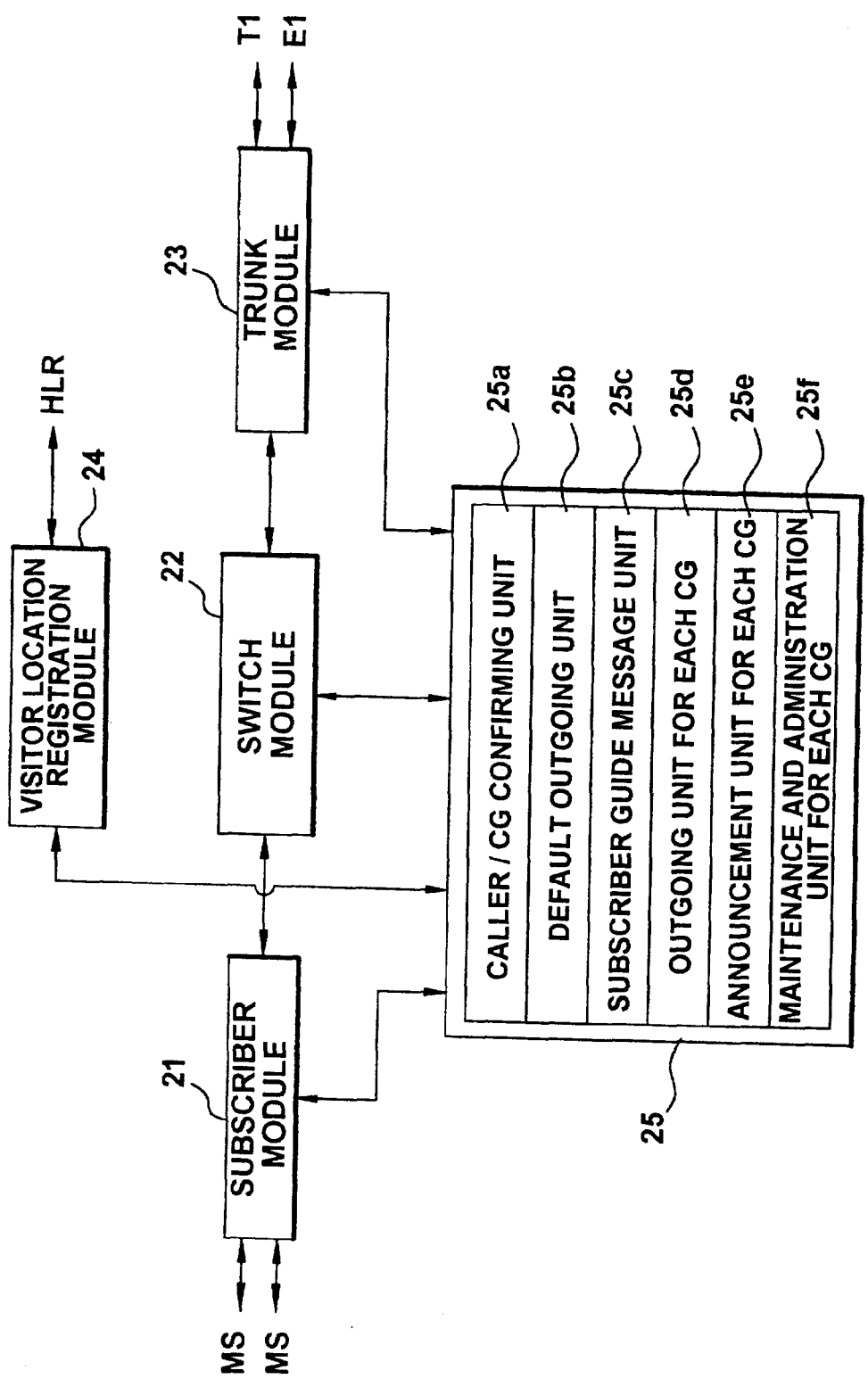
Figure 4:
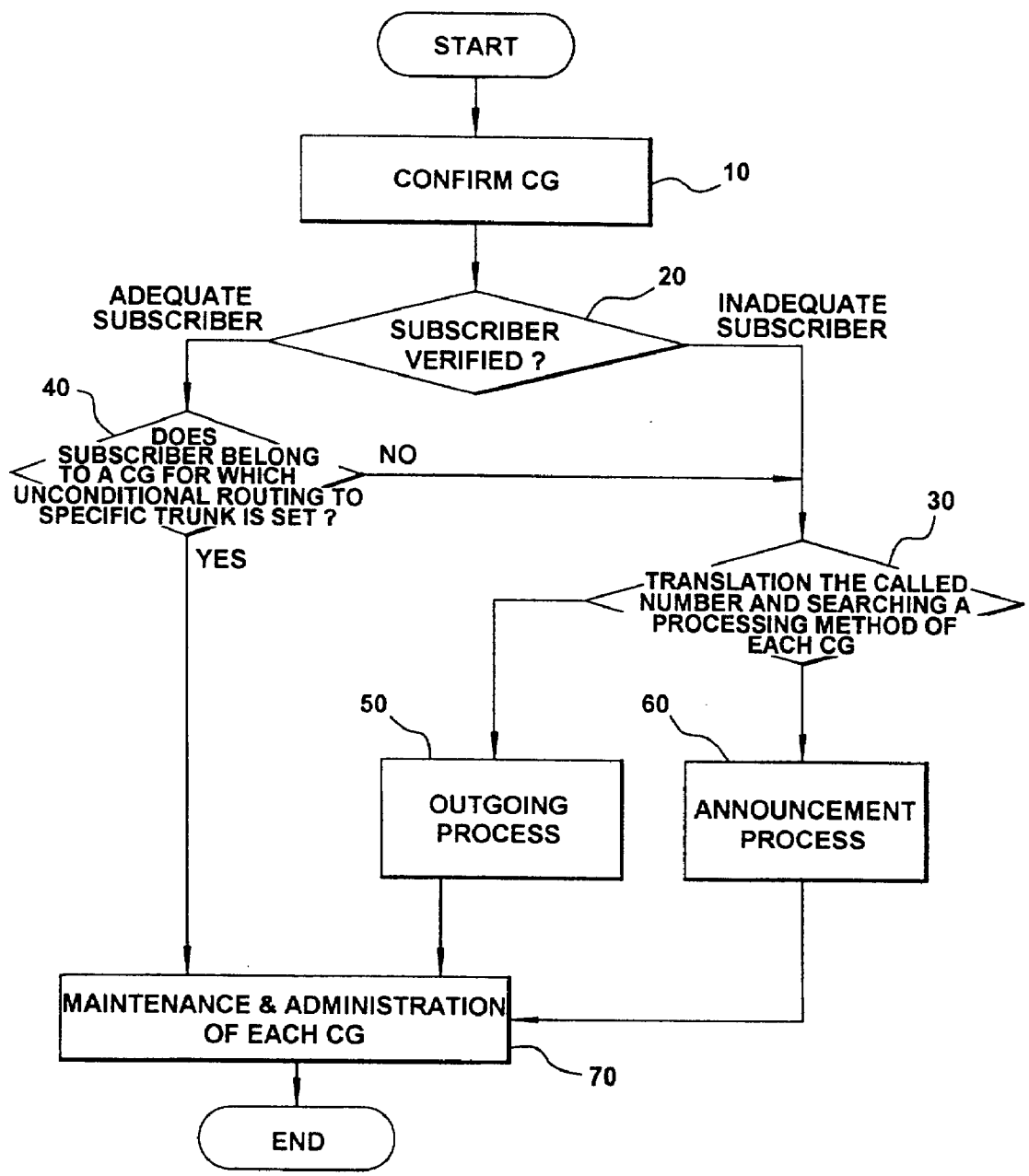
Figure 5A:
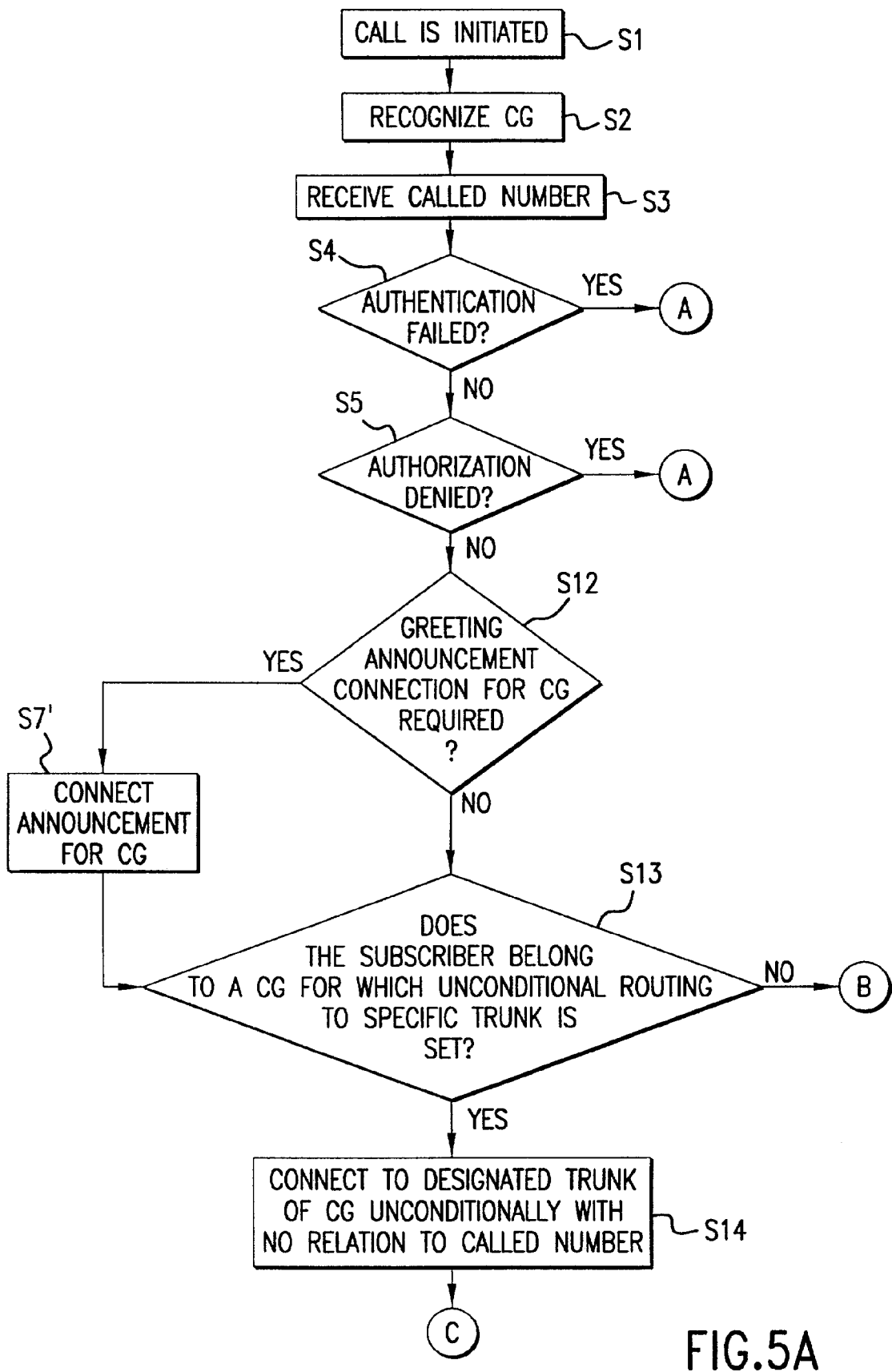
Figure 5B:
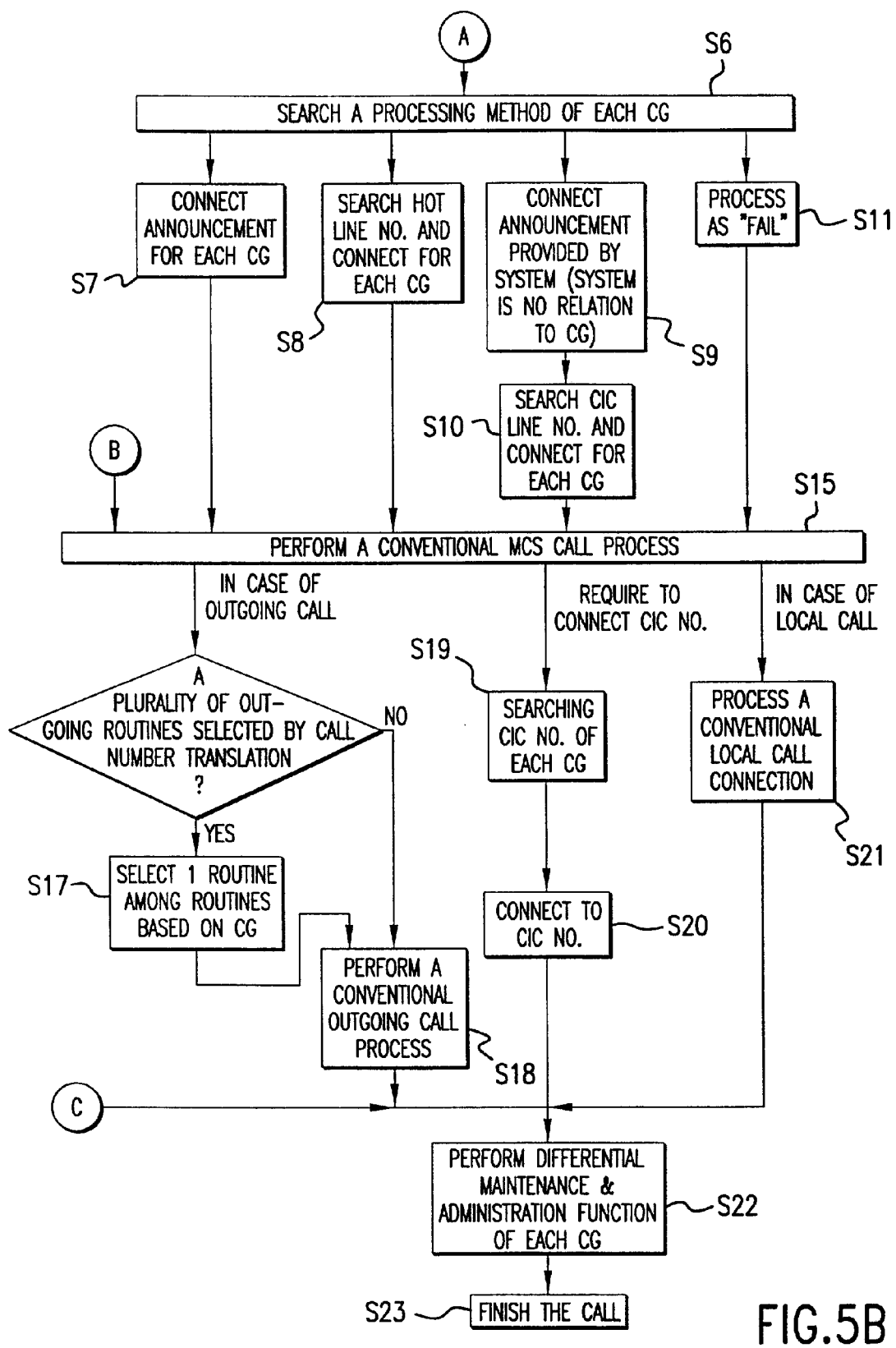

Other objects, features and advantages of the present invention will become more apparent from the following detailed description when read in conjunction with the accompanying drawings, of which:

FIG. 1 is a block diagram of a conventional MSC,

FIG. 2 is a flow chart indicating a call process operation in the conventional MSC referring to FIG. 1, FIG. 3 is a block diagram explaining a method for using a MSC in common according to an embodiment of the present invention, FIG. 4 is a flow chart indicating an overall signal processing for using the MSC in common according to an embodiment of the present invention, and FIGS. 5a and 5b are flowcharts indicating a call processing operation for using the MSC in common according to the present invention.

DETAILED DESCRIPTION OF THE PREFERRED EMBODIMENTS

Embodiments of the invention will be described with reference to FIGS. 3 to 5b.

FIG. 3 shows a block diagram explaining a method for using a mobile switching center (MSC) in common according to an embodiment of the present invention. The MSC comprises a location registration process unit 24 for exchanging information with a home location register (referring to HLR) and managing location information of visiting subscribers in its service area, a subscriber module 21 for connecting with a plurality of subscribers, a trunk module 23 for connecting a plurality of trunks, a switch module 22 for switching a speech path, and a control unit 25 for controlling a call processing above each unit. Here, the control unit 25 may comprise a caller and a CG confirming unit 25a, a default outgoing unit 25b, a subscriber guide message unit 25c, an outgoing unit 25d for each CG, an announcement unit 25e for each CG, and a maintenance and administration (hereinafter, M&A) unit 25f for each CG for identifying the corresponding CG (which the caller belongs to), and performing the proper call handling for the CG. By using each part of the control unit 25, it is possible to search whether a routine and the announcement are connected to a certain trunk designated to each CG respectively, to search a processing procedure and an M&A function for an inadequate subscriber, and to control each part according to the searched result.

FIG. 4 shows a flow chart indicating the overall signal processing for using the MSC in common according to an embodiment of the present invention. FIGS. 5a and 5b show flow charts indicating a call processing operation for using the MSC in common according to the present invention.

According to the embodiment shown in the FIG. 4 to FIG. 5b, a first process 10 comprises steps (S1, S2) of checking the CG number when a call is initiated, and confirming the CG in which the caller (subscriber of the calling party) belongs to.

A second process 20 is for confirming and processing information of the caller. The second process 20 comprises steps(S3–S5) of determining whether the caller is an adequate subscriber or an inadequate subscriber who should be limited in the call connection and verifying an authentication and authorization of the corresponding caller.

A third process 30 is for processing announcements. The third process 30 comprises the steps (S6–S11) of searching a processing method of each CG of inadequate subscribers, and then connecting a CG announcement to the caller(as one path) by looking for each CG announcement according to a CG policy. Here, the announcement will be connected to each CG, respectively. The process can perform other paths of connecting to a customer information center (CIC) number(as another path)with a hot line number of the corresponding CG by searching the hot line number connected to each CG, connecting an announcement (provided from the MSC system regardless of the CG) to the caller (as the other path), or processing as fail (as 4th path). The above 4 paths are altogether linked to a call processing step, described below.

A fourth process 40 is established with processing a default outgoing. The fourth process 40 comprises the steps (S12, S7) of determining that a subscriber joins a CG which desires to add a greeting announcement, and then connecting the corresponding greeting announcement of respective CG about the corresponding joined subscriber. And the fourth process 40 also comprises the steps (S13, S14) of determining that the subscriber joins a CG which is routing to a certain trunk unconditionally, and then routing to the designated trunk of each CG unconditionally regardless of the called number if the caller joins the CG using the certain trunk.

A 5th process 50 is established with an outgoing process of each CG. The 5th process 50 comprises the steps (S15–S18) of connecting the called number on the basis of an outgoing routine selected according to a translation of each allocated number of each CG or a called number, or according that whether an intra-office is connected, and then processing the initiated call.

A 6th process 60 is established with an announcement process for a CG requiring the announcement process. The 6th process 60 comprises the steps (S19, S20) of searching a CIC number searching table for an allocated CIC number for each CG about a caller joined in a group requiring to connect the CIC, and connecting to the CIC number of the corresponding CG.

A 7th process 70 is established with an M&A process of each CG. The 7th process 70 comprises the step (S22) of performing the M&A process in case of determining that a CG requires a differential M&A function of each CG, in which the CG desires to use a specific charging format different from other CGs.

For the above described scheme, subscriber calling group number(hereinafter, CG number) should be allocated to the all MC subscribers inside the MC networks for performing the first and second processes in the MSC applied to the present invention. In other words, a corresponding CG number (respective provider group number, in which an MC subscriber is registered) should be allocated in a respective subscriber profile stored in the HLR. Additionally, the calling group number should be sent to and stored on a visitor location register (VLR) through a proper map message (mobile application protocol) when a subscriber registers a location. In case that the corresponding CG number is not allocated in the HLR subscriber profile, it is assumed to provide a processing operation applying a default CG number in the MSC.

An authorization denied subscriber processing procedure searching table (hereinafter, referring to TABLE 1) of each CG, of storing data about a corresponding subscriber processing procedure when authentication is failed/ authorization is denied, should be included inside the MCS, for performing the third process. The TABLE 1 is properly used by storing predefined data according to each CG separately, in which the predefined data may determine that an announcement is connected to a respective CG, the hot line number is connected to a respective CG, a CIC number different from each other CG is connected to a respective CG after connecting an announcement provided from system as default to all CG subscribers, or "fail" is processed without any particular information to the calling subscriber.

TABLE 1

| CG No. | [2]Type | Announcement No. | Directory No. | etc. |
|---|---|---|---|---|
| 1 | One of 4 types | [3]Announcement source No. (CG specific or default) System | Hot line or CIC number | [4]True/false |
| 2 | One of 4 types | [3]Announcement source No. (CG specific or default) System | Hot line or CIC number | [4]True/false |
| . | . | . | . | . |
| . | . | . | . | . |
| . | . | . | . | . |
| [1]n | One of 4 types | [3]Announcement source No. (CG specific or default) System | Hot line or CIC number | [4]True/false |
| [1]n is a maximum CG number | [2]there are 4 kinds of processing type | [3]announcement source number for S12 type | Provider related called number | [4]Indication whether the process is failed or not |

An announcement searching table (TABLE 2) of storing predefined data should be included inside the exchange for performing the 4th process, in which the predefined data may confirm whether the call is connected after announcing the greeting to respective CG first or the only call connection is processed.

TABLE 2

| CG No. | [2]Announcement No. |
|---|---|
| 1 | Announcement source No. |
| . | . |
| . | . |
| [1]n | . |
| [1]n is a maximum CG number | [2]Greeting announcement source No. |

Additionally, an outgoing route searching table (TABLE 3) of storing predefined data should be included inside the exchange for performing the 4th process, in which the predefined data may confirm whether a subscriber joins a CG which desires to outgo the call to a certain trunk unconditionally when a corresponding CG subscriber of respective CG tries to call regardless of the called number.

TABLE 3

| CG No. | Outgoing Route No. |
|---|---|
| 1 | FF or outgoing Route No. |
| . | . |
| . | . |
| [1]n | FF or outgoing Route No. |
| [1]n is a maximum CG number | CG has a designated route No. or FF: CG does not have a designated routine. |

A called number correspond outgoing routine searching table (TABLE 4) of storing predefined data should be included inside MSC for performing the 5th process, in which the predefined data may confirm whether there is a case that a CG desires to connect a certain outgoing route only in accordance with the called number, in case that the CG is a particular subscriber group during selecting the outgoing route after processing a called number translation and a corresponding process as same as the translation and process of the conventional MSC and of confirming the above certain routine.

TABLE 4

| CG No. | Whether or not a specific route is used | Designated a specific route | Certain route |
|---|---|---|---|
| 1 | 00 or FF | pfx 1 | Route No. 1 |
| . | . | . | . |
| . | . | . | . |
| . | . | pfx m | Route No. m |
| . | . | . | . |
| . | . | . | . |
| [1]n | 00 or FF | pfx 1 | Route No. 1' |
| . | . | . | . |
| . | . | . | . |
| . | . | pfx m | Route No. m' |
| [1]n is a maximum CG number | 00: use a specific route FF: do not use specific route | Pfx I ~ pfxm: every prefix that can be dialed by CG subscriber | Connected route during outgoing when CG subscriber tries to connect the pfx. |

A customer information center (CIC) searching table (TABLE 5) of storing predefined data, should be included inside the MSC for performing the 5th and 6th processes, in which the predefined data may tell an allocated CIC number according to respective CG in case of connecting to the CIC during the conventional MSC call is processed.

TABLE 5

| CG No. | Corresponding call state | Announcement source No. |
|---|---|---|
| 1 | Call state 1 | corresponding announcement source No. |
| | . | corresponding announcement source No. |
| | . | |
| | Call state m | corresponding announcement source No. |
| | . | corresponding announcement source No. |
| | . | |
| [1]n | Call state 1' | corresponding announcement source No. |
| | . | corresponding announcement source No. |
| | . | |
| | Call state m' | Corresponding announcement source No. |
| [1]n is a maximum CG number | In case of connecting to announcement at the specific call state | Announcement source No. |

An M&A function searching table (TABLE 6) of storing predefined data and an M&A function data searching table (TABLE 7) of storing predefined data should be included inside the MSC for establishing the 7th process. Here, the predefined data in the TABLE 6 may confirm whether there is an M&A function (for example, charging format, statistic item, and etc) for processing with having a differential order according to respective CG. And the predefined data in the TABLE 7 may carry out the M&A function with having a differential order according to respective CG. The TABLE 7 represents a CG2 statistic sample in relation with TABLE 6 as one example.

TABLE 6

(as one example)

| CG No. | Charging | Statistic | Additional Service | Obstacle process | ... | Business function |
|---|---|---|---|---|---|---|
| 1 | FF | FF | FF | FF | | FF |
| 2 | FF | Pointer 1 | FF | FF | | FF |
| . | FF | Pointer 3 | pointer 1 | FF | | FF |
| [1]n | FF | FF | FF | FF | | pointer 5 |

[1]n is a maximum CG number
FF: particular process of each CG is not required.
Point n: designate a data storage location for processing when each CG requires a particular process.

TABLE 7

| Address No. | Item 1 | Item 2 | ... | Item n |
|---|---|---|---|---|
| Pointer 1 address | FF | 00 | | FF | x is a statistic item No.
Required by CG2 of Table 6.
00: add a corresponding statistic item.
FF: not add a corresponding statistic item.

A processing operation for using the above MSC in common confirms a CG, and uses the several differential processing table (TABLE 1 to TABLE 7) according to the respective CG established inside the MSC with the confirmed result. Accordingly, the several functions are differentially processed according to respective CG.

First, when a call is initialized from a caller (S1), the originating MSC checks the subscriber profile stored in the VLR and confirms a group which the subscriber joins(S2). After receiving a called number from the originating subscriber (S3), the MSC confirms whether an authentication is failed/authorization is denied by confirming the authentication/authorization after receiving the called number from originating subscriber (S4, S5). Here, the MSC searches how to process an inadequate subscriber on a basis of the TABLE 1 when the authentication is failed/authorization is denied (in other words, in case of an inadequate subscriber) (S6). The MSC connects (S7) the announcement according to a corresponding CG when the CG desires to add the announcement according to the respective CG with the searched result. The MSC announces to the caller that a communication service can not be provided, by processing(S8) the call to a corresponding CG hot line when the group desires to connect the hot line according to the respective CG with the searched result. The MSC connects a common announcement which is same to all subscribers, regardless of the CG when the CIC number of the respective CG is allocated (this case is different from the cases of S7 or S8) with the searched result (S9) and then connects to the CIC number of the corresponding CG (S10). Additionally, the MSC cancels the call when a CG desires to process the call as fail without any particular process (S11).

With the authentication/authorization verifying result, the MSC confirms whether a adequate subscriber joins a CG which desires to add the greeting announcement different with other CG announcements, on a basis of the TABLE 2 (S12), and connects (S7) the corresponding announcement of the corresponding CG, if so.

Additionally, with the CG number confirming result, the MSC performs (S14) the routing process to a corresponding outgoing routine regardless of the called number dialed by the originator when the subscriber joins the CG which desires to route to a certain trunk unconditionally (yes branch of S13).

With the verified result, the MSC generally performs the call processing of the conventional MSC in case of the adequate subscriber ("no" branch of S5), and in case that the subscriber does not join the CG which desires to route to the certain outgoing routine regardless of the called number ("no" branch of S13).

It is capable of performing differentially the general call process by having 3 paths according to a called number dialed by the CG subscriber.

First path is processed when a CG provider tries to connect the joined subscriber to a certain station(area) about a certain called number via a special route. Because a plurality of outgoing routines may be selected as a correspondence outgoing routine, the MSC determines that the outgoing routine is plural in case of requiring the outgoing routing (S16). If so, the MSC selects a routine among the plurality of routines in accordance with the CG (S17) and then performs the outgoing call process (S18). The present invention includes the processes about all conditions which the outgoing routine exists separately according the calling group (CG) (in other words, a mobile network provider that a caller joins), even though it is a concrete method for performing the above functions to use software of the respective MSC.

Another path of a general call processing is required when a MSC connects to the CIC, in case that a particular condition is generated in the normal call processing procedure. In this case, the MSC uses the TABLE 1 for searching the CIC number (S19) and then connects to a corresponding CIC number (S20).

And the MSC connects to the intra-office as same as the conventional way in case of connecting the intra-office (S21).

After processing the above call processing procedure or during processing, the MSC performs the M&A function according to the respective CG by confirming (S22) whether there are items requiring the differential processing according to the respective CG, and the data required for processing the items, using the TABLE 6, TABLE 7. Here, the items are a charging format or a statistic item, etc. among the MSC M&A functions according to the respective CG. And after completing the above process, the corresponding call processing is finished (S23).

The present invention described above may use an MSC in common by several communication providers because of differently processing by confirming which subscriber group that a caller joins and confirming services using a predefined data table, in which the services are such as, trunk connection, announcement, charging format, statistic format, additional service, data for network operation, etc.

Accordingly, the present invention has advantage capable of reducing an expense of installation and management overlapped in among the communication providers because an exchange is used in common by several providers by differentially processing the services in the exchange on a basis of the calling group (CG) when the call is initiated by the MC subscriber.

Thus, it is apparent that there has been provided, in accordance with the present invention, a method for using the MSC that satisfy the advantages set forth above. Although the preferred embodiment has been described in detail, it should be understood that various changes, substitutions, and alterations can be initiated herein without departing from the spirit and scope of the present invention as defined by the following claims.

What is claimed is:

1. A method of using a mobile switching center in common among a plurality of service providers, comprising:

receiving a call initiated from a mobile subscriber;

determining a caller group associated with the mobile subscriber, receiving a called number from the mobile subscriber;

performing authentication and authorization processes for the mobile subscriber; and processing services for the mobile subscriber within the mobile switching center according to processing information corresponding to the caller group;

wherein, when the mobile subscriber is authenticated and authorized, processing services for the mobile subscriber comprises:

determining according to the caller group whether a designated greeting announcement is required;

when the designated greeting announcement is required, supplying the designated greeting announcement to the mobile subscriber;

determining a particular trunk to which the call is to be routed; and routing the call to the particular trunk;

wherein determining whether the designated greeting announcement is required comprises searching an announcement search table according to the caller number; and wherein the announcement search table comprises a pluralities of entries, each entry having a caller group number and a corresponding indication of whether to supply a corresponding greeting announcement.

2. A method of using a mobile switching center in common among a plurality of service providers, comprising:

receiving a call initiated from a mobile subscriber;

determining a caller group associated with the mobile subscriber, receiving a called number from the mobile subscriber;

performing authentication and authorization processes for the mobile subscriber; and processing services for the mobile subscriber within the mobile switching center according to processing information corresponding to the caller group;

wherein, when the mobile subscriber is authenticated and authorized, processing services for the mobile subscriber comprises:

determining according to the caller group whether a designated greeting announcement is required;

when the designated greeting announcement is required, supplying the designated greeting announcement to the mobile subscriber;

determining a particular trunk to which the call is to be routed; and routing the call to the particular trunk;

wherein determining the particular trunk to which the call is to be routed comprises determining according to the caller group whether to unconditionally route the call to a designated trunk regardless of the called number;

wherein determining whether to unconditionally route the call to the designated trunk regardless of the called number comprises searching an outgoing route search table according to the caller group; and wherein the outgoing route search table comprises a plurality of entries, each entry having a caller group number and an indication of whether to unconditionally route the call to a corresponding trunk.

3. A method of using a mobile switching center in common among a plurality of service providers, comprising:

receiving a call initiated from a mobile subscriber;

determining a caller group associated with the mobile subscriber, receiving a called number from the mobile subscriber;

performing authentication and authorization processes for the mobile subscriber; and processing services for the mobile subscriber within the mobile switching center according to processing information corresponding to the caller group;

wherein, when the mobile subscriber is authenticated and authorized, processing services for the mobile subscriber comprises:

determining according to the caller group whether a designated greeting announcement is required;

when the designated greeting announcement is required, supplying the designated greeting announcement to the mobile subscriber;

determining a particular trunk to which the call is to be routed; and routing the call to the particular trunk;

wherein determining the particular trunk to which the call is to be routed comprises searching a called-number outgoing routine search table according to the caller group and the called number; and wherein the called-number outgoing routine search table comprises a plurality of entries, each having a caller group number, a called number indicator corresponding to at least one possible called number, an indication of whether a certain trunk is to be used, and a corresponding outgoing route number for the certain trunk.

4. A method of using a mobile switching center in common among a plurality of service providers, comprising:

receiving a call initiated from a mobile subscriber;

determining a caller group associated with the mobile subscriber, receiving a called number from the mobile subscriber;

performing authentication and authorization processes for the mobile subscriber; and processing services for the mobile subscriber within the mobile switching center according to processing information corresponding to the caller group;

wherein, when the mobile subscriber is authenticated and authorized, processing services for the mobile subscriber comprises:

determining according to the caller group whether a designated greeting announcement is required;

when the designated greeting announcement is required, supplying the designated greeting announcement to the mobile subscriber;

determining a particular trunk to which the call is to be routed; and routing the call to the particular trunk;

wherein when the mobile subscriber is authenticated and authorized, processing services for the mobile subscriber comprises processing the call by one selected from a group consisting of connecting the call with a local termination, connecting the call with a designated number for the caller group, and connecting the call with a certain trunk determined according to the caller group and the called number; and wherein connecting the call with a designated number for the caller group comprises:
  searching a customer information center search table according to the caller group to determine a designated customer information center, and
  connecting the subscriber with the designated customer information center.

5. A method of using a mobile switching center in common among a plurality of service providers, comprising:
  receiving a call initiated from a mobile subscriber;
  determining a caller group associated with the mobile subscriber,
  receiving a called number from the mobile subscriber;
  performing authentication and authorization processes for the mobile subscriber; and
  processing services for the mobile subscriber within the mobile switching center according to processing information corresponding to the caller group;
  wherein, when the mobile subscriber is authenticated and authorized, processing services for the mobile subscriber comprises:
    determining according to the caller group whether a designated greeting announcement is required;
    when the designated greeting announcement is required, supplying the designated greeting announcement to the mobile subscriber;
    determining a particular trunk to which the call is to be routed; and
    routing the call to the particular trunk;
  the method further comprising:
    processing charging and statistics for the call within the mobile switching center according to charging information and statistics corresponding to the caller group;
    wherein processing charging and statistics for the call comprises searching a maintenance and administration function search table according to the caller group to determine a charging format and desired statistic items; and
    wherein the maintenance and administration function search table comprises a plurality of entries, each entry having a caller group number, a charging format, desired statistic items data, additional service data, and call failure processing data.

6. A method of using a mobile switching center in common among a plurality of service providers, comprising:
  receiving a call initiated from a mobile subscriber;
  determining a caller group associated with the mobile subscriber,
  receiving a called number from the mobile subscriber;
  performing authentication and authorization processes for the mobile subscriber; and
  processing services for the mobile subscriber within the mobile switching center according to processing information corresponding to the caller group;
  wherein, when the mobile subscriber is authenticated and authorized, processing services for the mobile subscriber comprises:
    determining according to the caller group whether a designated greeting announcement is required;
    when the designated greeting announcement is required, supplying the designated greeting announcement to the mobile subscriber;
    determining a particular trunk to which the call is to be routed; and
    routing the call to the particular trunk;
  wherein, when the mobile subscriber is not authenticated and authorized, processing services for the mobile subscriber comprises:
    searching an authentication-failed/authorization-denied processing procedure search table according to the caller group to determine a corresponding authentication-failed/authorization-denied subscriber processing procedure; and
    executing the corresponding authentication-failed/authorization-denied subscriber processing procedure;
    wherein executing the corresponding authentication-failed/authorization-denied subscriber processing procedure comprises:
      determining according to the caller group whether a default group announcement is required; and
      when the default group announcement is required, supply the default group announcement to the mobile subscriber.

7. A method of using a mobile switching center in common among a plurality of service providers, comprising:
  receiving a call initiated from a mobile subscriber;
  determining a caller group associated with the mobile subscriber,
  receiving a called number from the mobile subscriber;
  performing authentication and authorization processes for the mobile subscriber; and
  processing services for the mobile subscriber within the mobile switching center according to processing information corresponding to the caller group;
  wherein, when the mobile subscriber is authenticated and authorized, processing services for the mobile subscriber comprises:
    determining according to the caller group whether a designated greeting announcement is required;
    when the designated greeting announcement is required, supplying the designated greeting announcement to the mobile subscriber;
    determining a particular trunk to which the call is to be routed; and
    routing the call to the particular trunk;
  wherein, when the mobile subscriber is not authenticated and authorized, processing services for the mobile subscriber comprises:
    searching an authentication-failed/authorization-denied processing procedure search table according to the caller group to determine a corresponding authentication-failed/authorization-denied subscriber processing procedure; and
    executing the corresponding authentication-failed/authorization-denied subscriber processing procedure;
    wherein, the authentication-failed/authorization-denied processing procedure search table comprises a plurality of entries, each entry having a caller group number, a processing type, a group announcement type, a hot-line number, and an indication whether the call should be processed as a failed call.

8. A method of using a mobile switching center in common among a plurality of service providers, comprising:
  receiving a call initiated from a mobile subscriber;

determining a caller group associated with the mobile subscriber, receiving a called number from the mobile subscriber;

performing authentication and authorization processes for the mobile subscriber; and processing services for the mobile subscriber within the mobile switching center according to processing information corresponding to the caller group;

wherein, when the mobile subscriber is authenticated and authorized, processing services for the mobile subscriber comprises:

determining according to the caller group whether a designated greeting announcement is required;

when the designated greeting announcement is required, supplying the designated greeting announcement to the mobile subscriber;

determining a particular trunk to which the call is to be routed; and routing the call to the particular trunk;

wherein when the mobile subscriber is authenticated and authorized, processing services for the mobile subscriber comprises processing the call by one selected from a group consisting of connecting the call with a local termination, connecting the call with a designated number for the caller group, and connecting the call with a certain trunk determined according to the caller group and the called number;

wherein connecting the call with a designated number for the caller group comprises:

searching a customer information center search table according to the caller group to determine a designated customer information center, and connecting the subscriber with the designated customer information center.

9. A method of using a mobile switching center in common among a plurality of service providers, comprising:

receiving a call initiated from a mobile subscriber;

determining a caller group associated with the mobile subscriber, receiving a called number from the mobile subscriber;

performing authentication and authorization processes for the mobile subscriber; and processing services for the mobile subscriber within the mobile switching center according to processing information corresponding to the caller group;

wherein, when the mobile subscriber is authenticated and authorized, processing services for the mobile subscriber comprises:

determining according to the caller group whether a designated greeting announcement is required;

when the designated greeting announcement is required, supplying the designated greeting announcement to the mobile subscriber;

determining a particular trunk to which the call is to be routed; and routing the call to the particular trunk;

the method further comprising:

processing charging and statistics for the call within the mobile switching center according to charging information and statistics corresponding to the caller group;

wherein processing charging and statistics for the call comprises searching a maintenance and administration function search table according to the caller group to determine a charging format and desired statistic items; and wherein the maintenance and administration function search table comprises a plurality of entries, each entry having a caller group number, a charging format, desired statistic items data, additional service data, and call failure processing data.

10. A method of using a mobile switching center in common among a plurality of service providers, comprising:

receiving a call initiated from a mobile subscriber, determining a caller group associated with the mobile subscriber;

receiving a called number from the mobile subscriber;

performing authentication and authorization processes for the mobile subscriber; and processing services for the mobile subscriber within the mobile switching center according to processing information corresponding to the caller group;

wherein, when the mobile subscriber is not authenticated and authorized, processing services for the mobile subscriber comprises:

searching an authentication-failed/authorization-denied processing procedure search table according to the caller group to determine a corresponding authentication-failed/authorization-denied subscriber processing procedure; and executing the corresponding authentication-failed/authorization-denied subscriber processing procedure;

wherein executing the corresponding authentication-failed/authorization-denied subscriber processing procedure comprises:

determining according to the caller group whether a corresponding group announcement is required; and when the corresponding group announcement is required, supplying the corresponding group announcement to the mobile subscriber.

11. A method of using a mobile switching center in common among a plurality of service providers, comprising:

receiving a call initiated from a mobile subscriber;

determining a caller group associated with the mobile subscriber;

receiving a called number from the mobile subscriber;

performing authentication and authorization processes for the mobile subscriber; and processing services for the mobile subscriber within the mobile switching center according to processing information corresponding to the caller group;

wherein, when the mobile subscriber is not authenticated and authorized, processing services for the mobile subscriber comprises:

searching an authentication-failed/authorization-denied processing procedure search table according to the caller group to determine a corresponding authentication-failedlauthorization-denied subscriber processing procedure; and executing the corresponding authentication-failed/authorization-denied subscriber processing procedure;

wherein executing the corresponding authentication-failed/authorization-denied subscriber processing procedure comprises:

determining according to the caller group whether a default group announcement is required; and when the default group announcement is required, supplying the default group announcement to the mobile subscriber.

12. A method of using a mobile switching center in common among a plurality of service providers, comprising:
receiving a call initiated from a mobile subscriber;
determining a caller group associated with the mobile subscriber;
receiving a called number from the mobile subscriber;
performing authentication and authorization processes for the mobile subscriber; and
processing services for the mobile subscriber within the mobile switching center according to processing information corresponding to the caller group;
wherein, when the mobile subscriber is not authenticated and authorized, processing services for the mobile subscriber comprises:
searching an authentication-failed/authorization-denied processing procedure search table according to the caller group to determine a corresponding authentication-failed/authorization-denied subscriber processing procedure; and
executing the corresponding authentication-failed/authorization-denied subscriber processing procedure
wherein executing the corresponding authentication-failed/authorization-denied subscriber processing procedure comprises:
determining according to the caller group a corresponding hot-line number; and
connecting the mobile subscriber to the corresponding hot-line number.

13. A method of using a mobile switching center in common among a plurality of service providers, comprising:
receiving a call initiated from a mobile subscriber;
determining a caller group associated with the mobile subscriber;
receiving a called number from the mobile subscriber;
performing authentication and authorization processes for the mobile subscriber; and
processing services for the mobile subscriber within the mobile switching center according to processing information corresponding to the caller group;
wherein, when the mobile subscriber is not authenticated and authorized, processing services for the mobile subscriber comprises:
searching an authentication-failed/authorization-denied processing procedure search table according to the caller group to determine a corresponding authentication-failed/authorization-denied subscriber processing procedure; and
executing the corresponding authentication-failed/authorization-denied subscriber processing procedure;
wherein, the authentication-failed/authorization-denied processing procedure search table comprises a plurality of entries, each entry having a caller group number, a processing type, a group announcement type, a hot-line number, and an indication whether the call should be processed as a failed call.

\* \* \* \* \*

UNITED STATES PATENT AND TRADEMARK OFFICE
CERTIFICATE OF CORRECTION

PATENT NO. : 6,266,526 B1
DATED : July 24, 2001
INVENTOR(S) : Young J. Kim

It is certified that error appears in the above-identified patent and that said Letters Patent is hereby corrected as shown below:

Title page,
Item [30], Foreign Application Priority Data, change
"Jun. 30, 1998 (KR) .................................. 98-25928" to
-- December 31, 1997 (KR) ...........................P97-82195 --.

Signed and Sealed this

Seventeenth Day of September, 2002

Attest:

JAMES E. ROGAN
Attesting Officer
Director of the United States Patent and Trademark Office